(12) United States Patent
Blum

(10) Patent No.: US 7,306,865 B2
(45) Date of Patent: Dec. 11, 2007

(54) ELECTRODE ARRANGEMENT FOR A FUEL CELL HAVING SECTORED HEADPLATES

(75) Inventor: Stephan Rüdiger Blum, Düsseldorf (DE)

(73) Assignee: 2S-Sophisticated Systems Limited, London (GB)

(*) Notice: Subject to any disclaimer, the term of this patent is extended or adjusted under 35 U.S.C. 154(b) by 248 days.

(21) Appl. No.: 10/481,926

(22) PCT Filed: Jul. 4, 2002

(86) PCT No.: PCT/DE02/02446

§ 371 (c)(1),
(2), (4) Date: Mar. 10, 2004

(87) PCT Pub. No.: WO03/005466

PCT Pub. Date: Jan. 16, 2003

(65) Prior Publication Data

US 2004/0197637 A1    Oct. 7, 2004

(30) Foreign Application Priority Data

Jul. 5, 2001    (DE) .............................. 101 32 078

(51) Int. Cl.
*H01M 4/86* (2006.01)
*H01M 8/24* (2006.01)

(52) U.S. Cl. .............................. 429/32; 429/40; 429/31
(58) Field of Classification Search .................. 429/31
See application file for complete search history.

(56) References Cited

U.S. PATENT DOCUMENTS

| 4,719,157 A | * | 1/1988 | Tsutsumi et al. ............. 429/34 |
| 4,876,163 A | * | 10/1989 | Reichner ..................... 429/30 |
| 6,495,281 B1 | * | 12/2002 | Eshraghi ..................... 429/40 |
| 2002/0197520 A1 | * | 12/2002 | Quick et al. .................. 429/32 |
| 2003/0134169 A1 | * | 7/2003 | Sarkar et al. ................. 429/31 |

FOREIGN PATENT DOCUMENTS

| DE | 195 17 425 C1 | | 10/1996 |
| JP | 09223507 | | 8/1996 |
| WO | WO 99/17390 | * | 4/1999 |
| WO | WO 02/09212 A1 | | 1/2002 |

* cited by examiner

*Primary Examiner*—Jonathan Crepeau
*Assistant Examiner*—Tony Chuo
(74) *Attorney, Agent, or Firm*—Cohen Pontani Lieberman & Pavane LLP

(57) ABSTRACT

In order to increase the output of a fuel cell, the fuel cell has an electrode arrangement comprising a number of series-connected electrode bundles (1-6), each consisting of a number of parallelly connected electrodes (7) and each being electrically connected and captive at the ends.

19 Claims, 3 Drawing Sheets

ELECTRODE ARRANGEMENT FOR A FUEL CELL HAVING SECTORED HEADPLATES

PRIORITY CLAIM

This is a U.S. national stage of application No. PCT/DE02/02446, filed on 4 Jul. 2002. Priority is claimed on that application and on the following application(s): Country: Germany, Application No.: 101 32 078.7, Filed: 5 July 2001.

The invention relates to an electrode arrangement, in particular for a fuel cell.

BACKGROUND OF THE INVENTION

1. Field of the Invention
2. Description of the Prior Art

It is known from WO 00/54358 to connect electrodes for fuel cells in parallel or in series. For example, it is proposed therein to electrically connect to one another the anode, which is arranged at a free end of an electrode of coaxial design, to that surface of a further, identical electrode which is designed as a cathode, to provide a series connection.

Furthermore, the design of fuel cell modules is explained, in which a multiplicity of individual electrodes are arranged in each case in a plane in a frame and are connected in a cascade. In this case, those surfaces of the individual electrodes which are designed as a cathode are directly in contact and the anodes of the individual electrodes are connected to one another on an end side of the module.

Individual modules of this type may, in turn, be connected in a cascade and/or in series.

The comparatively complex design of the known modules and the necessity of electrically insulating individual modules from one another in a series connection represent a considerable technical effort. In particular, the operational reliability of a fuel cell having modules of this type, in particular modules which are connected in series, is also questionable, since, if the single, electrical connection between the modules is interrupted, the entire fuel cell no longer functions.

SUMMARY OF THE INVENTION

Against this technical background, the invention has the object of providing an electrode arrangement for a fuel cell, which arrangement has a simple structural design, but is extremely efficient and the geometry of which can be designed in a simple manner and which can have, in particular, a circular cross section.

The solution to this technical problem is focused on an electrode arrangement for a fuel cell, which arrangement has, according to claim 1, a plurality of electrode bundles which in each case comprise a plurality of electrodes connected in parallel, are connected in series, are gathered together in each case on the end side and are connected electrically.

An electrode arrangement of this type expediently requires electrodes whose cathode or anode can be tapped off on the end side. As a consequence, it is possible to connect the anodes or cathodes of the electrodes of an electrode bundle electrically to one another on the end side in order thereby to obtain a cascade connection of a multiplicity of electrodes. As a consequence, the failure of one electrode, possibly even a plurality of electrodes, of an electrode bundle will have hardly any effect on its functioning capability.

A plurality of electrode bundles of this type, preferably of identical design, are further connected in series, for which purpose electrode bundles rotated through 180° are arranged in an alternating manner.

The electrodes are gathered together on the end side, this providing sufficient stability overall. It is preferably conceivable here for the ends of the electrodes forming an electrode bundle to be taken hold of together, it also being possible for the electrical connection to be undertaken by the holder. In particular, these holders of the electrode bundles connected in series is furthermore designed to be mechanically common, but separated electrically from one another.

This structural design permits electrode arrangements of virtually any desired geometry, in particular even of circular ring-shaped cross section.

In one structural refinement, provision is made for the electrodes to be spaced apart from one another. This measure ensures that, for example, combustion gas, flow readily against each individual electrode or flows readily through the electrode arrangement.

In one structural refinement, provision may furthermore be made for electrode bundles to be held in each case on the end side in electrically conductive sectors, which are insulated from one another, of a common head plate. The electrodes are therefore held on the end side and connected electrically to one another in a simple manner. In this case, the sectors are preferably designed as sectors of a circle, with which a circular ring-shaped cross section of the electrode arrangement can be formed.

In order to connect electrode bundles in series, provision is preferably made for this purpose for two electrode bundles arranged with opposing poles to be connected in an electrically conductive manner and, in particular, also gathered together in one sector. In this connection, it may be expedient, if the electrode bundles are in each case held on the end side together in a head plate, to arrange the sectors rotated relative to one another with respect to a central axis.

In this connection, provision is furthermore generally made for a first head plate to have n sectors and for a second head plate to have n+1 sectors, n representing a whole number. The second head plate will therefore have the plus and the minus pole of the electrode arrangement, in particular in sectors lying next to one another.

The individual sectors may be separated from one another, for example, by insulating layers. However, it is preferred for nonconductive webs to separate the sectors electrically from one another. In this case, in addition to the function of connecting the sectors but insulating them electrically from one another, the webs also have a supporting function, in particular if a common head plate is formed. It is then furthermore appropriate also to fix the electrode arrangement in a fuel cell to these nonconductive webs, for example.

In one preferred refinement, provision is made for the webs to be held at one end in a center in the manner of spokes to form a star. The sectors are therefore designed in a simple manner as sectors of a circle. If, in particular in a further refinement, provision is made for the free ends of the webs of a star to be enclosed by a ring, the production of the electrode arrangement according to the invention is made possible in a particular simple manner. This is because, after the corresponding ends of the electrode bundles are inserted into the sectors, these ends can be sealed in a simple manner, since the regions which are to be sealed are already predetermined in terms of shape without needing further molds or the like.

Provision may be made for the ring to be extended axially in the manner of a sleeve until it overlaps the entire axial extent of the electrode arrangement. A "housing" can thus be formed and/or fastening possibilities within a fuel cell can be made available.

In another structural refinement, provision is made for the centers of opposite head plates to be connected by a central rod, in particular for the centers of two stars to be connected to each other by a central rod of this type. An exact positioning of the individual electrode bundles is therefore predetermined. Also, if subjected to an axial load, a transmission of force does not take place via the electrodes themselves, but rather this will take place via the central rod. High mechanical stability is therefore ensured.

Provision may be made for the electrodes to be arranged extending rectilinearly and in parallel. A simple structural design is therefore ensured. However, as an alternative, provision may be made for the electrodes to be arranged coiled. In consequence, in comparison to electrodes arranged rectilinearly, with the electrode arrangement having the same axial extent, a higher voltage is produced owing to the coiled electrodes which are of longer design. A greater packing density is therefore achieved.

In one variant of the electrode arrangement according to the invention, the design of an individual electrode is simplified, and a common external electrode is provided for an electrode bundle, at which a tap can be led off in a simple manner to provide a voltage potential counter to the enclosed electrode bundle.

In this case, it has proven expedient if the common external electrode encloses, in cross section, a sector of a circle, in particular if a plurality of external electrodes arranged lying next to one another together are arranged forming a circle. An extremely compact structural form can therefore be achieved, and a parallel connection is made possible in a simple manner by electrically connecting the external electrodes. It is preferred, however, for the opposite surfaces of external electrodes lying next to one another to be arranged separated electrically from one another, so that a cascade circuit is also made possible in the manner explained at the beginning. The sectors of a circle of two external electrodes lying next to each other can then correspond to an electrically conductive sector of a head plate.

If an electrode arrangement of this type is provided with an external electrode, further electrodes can be provided spaced apart radially and also parallel to said arrangement, it also being possible, in particular, for the electrodes to have different axial extents.

In particular for the electrode arrangement according to the invention which was described at the beginning, it has proven expedient to provide a support device, in which provision is made for the centers of two stars of webs held in the manner of spokes to be connected by a central part. A support device of this type makes it possible to exactly predetermine the positioning of electrode bundles which, moreover, are connected in a mechanically stable manner to the support device. In this case, it is expedient if the number of webs of the stars differs by one. A secure electrical connection to the star having one web more is therefore made possible in a simple manner.

In one preferred refinement, the support is manufactured integrally from an electrically insulating material, for example from a plastic.

In order to make it possible to seal in the free ends of the electrodes or electrode bundles, provision may furthermore be made to enclose the free ends of the webs of a star with a ring. This ring will then generally mark the outer ring of a head plate. If appropriate, a ring of this type may also be extended axially in the manner of a sleeve.

BRIEF DESCRIPTION OF THE DRAWINGS

The invention will be explained in greater detail with reference to the drawing, in which exemplary embodiments are illustrated merely schematically. In the drawings.

DETAILED DESCRIPTION OF THE PRESENTLY PREFERRED EMBODIMENTS

Figure 1:
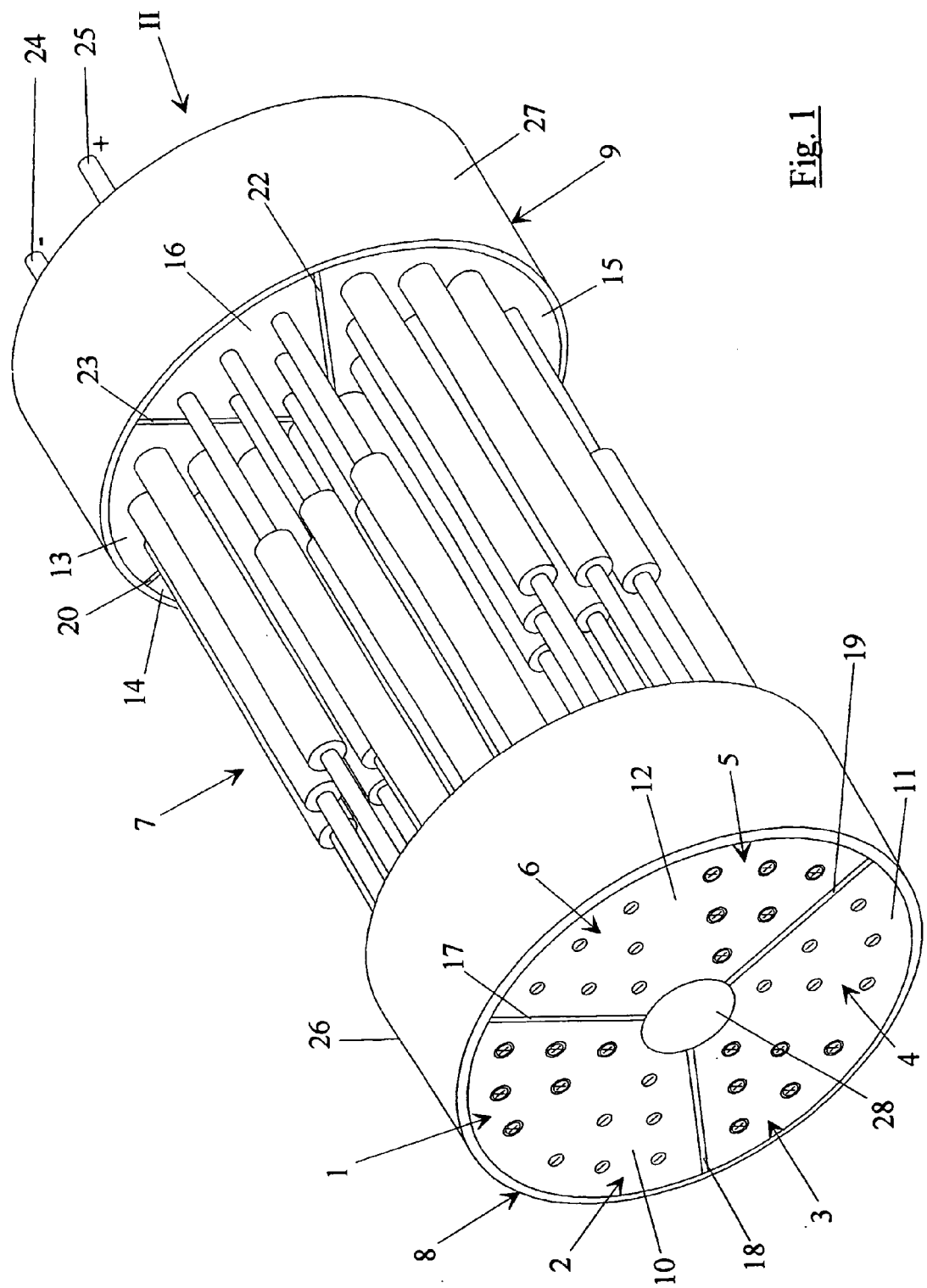
FIG. 1 is an isometric illustration of an electrode arrangement according to the invention.
Figure 2:
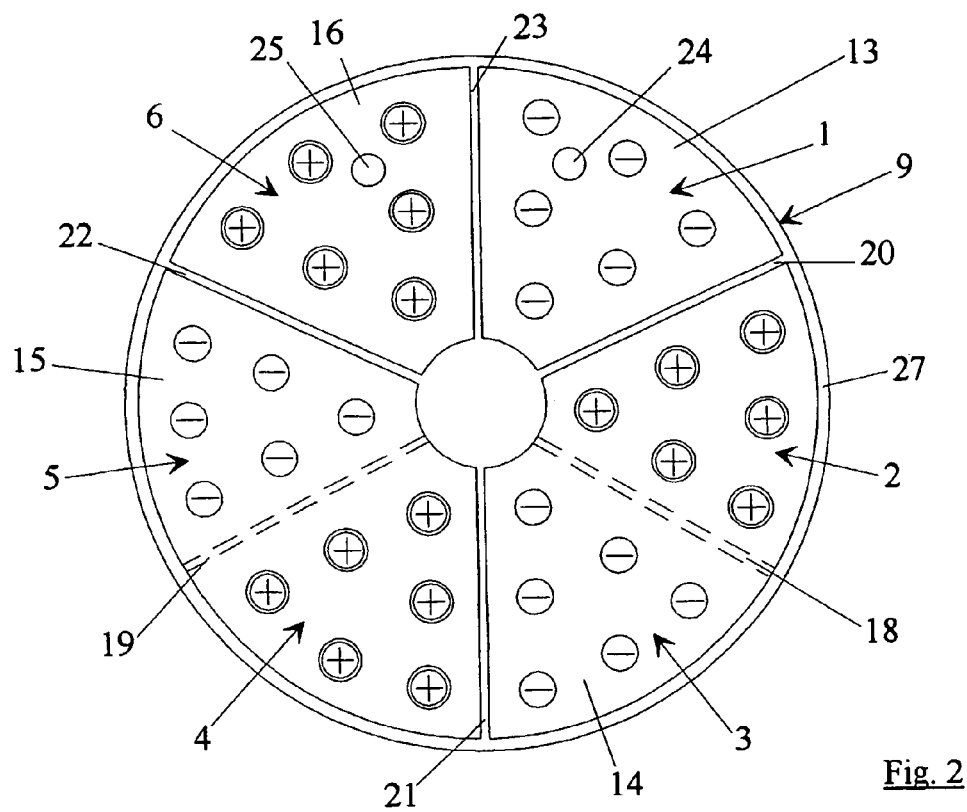
FIG. 2 is a side view of the electrode arrangement according to the arrow II in FIG. 1.

FIG. 1 shows an electrode arrangement according to the invention for a fuel cell with, by way of example, six electrode bundles 1 to 6 which consist, in turn, by way of example, of six individual electrodes 7 which are connected in parallel.

In contrast, the electrode bundles 1 to 6 themselves are connected in series.

Each of the electrodes 7 is of coaxial design and the plus and minus poles can be tapped off on the end sides. The electrochemical reaction, for example, between a combustion gas and an oxidant generally takes place in the case of electrodes 7 of this type via the coaxial structure thereof, the design of the structure being dependent on whether the combustion gas, for example, flows through or against the electrodes 7.

In order, in particular, to ensure that the flow passes against each electrode 7, the electrodes 7 are spaced apart from one another.

The electrodes 7 or the electrode bundles 1 to 6 are held on the end side in head plates 8, 9 and also are connected electrically in these head plates 8, 9.

For this purpose, the head plates 8, 9 are divided into sectors of an electrically conductive material, here into sectors of a circle 10 to 12 of the head plate 8 and 13 to 16 of the head plate 9, said sectors being separated electrically from one another by webs 17 to 19 and webs 20 to 23 of a nonconductive material.

The first head plate 8 has just three sectors 10 to 12, while the second head plate 9 has one sector more, so that the minus pole 24 and the plus pole 25 of the electrode arrangement, for example, can be tapped off there. In general terms, this means that the first head plate 8 has a number of n sectors and the second head plate 9 has a number of n+1 sectors, n representing a whole number.

The first electrode bundle 1 with electrodes 7 arranged rectilinearly and in parallel extends between the sector 13 having the minus pole 24 of the head plate 9 and the sector 10 of the first head plate 8 and is held there in the sector 10, for example in a conductive sealing compound, as a result of which the cathodes of the electrodes 7 of the electrode bundle 1 are also connected conductively to one another and thus their parallel connection is ensured there. These cathodes of the first electrode bundle 1 are characterized in the sector 10 by the plus sign.

In the same manner, the anodes the electrode bundle 2 are held in the electrically conductive sector 10 and are connected in an electrically conductive manner in a parallel circuit. The anodes are illustrated by the minus sign.

The cathodes of the electrode bundle 2 are then connected in parallel in the same manner in the sector 14 of the head plate 9 and are connected in an electrically conductive manner to the anodes, which are likewise connected in parallel, of the electrode bundle 3 which has, at the other end, in the head plate 8 cathodes which are connected in parallel in the sector 11.

In the sector 11, the electrode bundle 4 is, in turn, held on the end side on the anode side and is also electrically connected together. The parallel connection of the electrode bundle 4 on the cathode side takes place in the sector 15 of the head plate 9, in which the anodes of the electrode bundle 5 are furthermore connected in parallel. The cathodes of the electrode bundle 5 are gathered and connected in the sector 12, together with the anodes of the electrodes of the electrode bundle 6. Its cathodes which are gathered and connected electrically in the sector 16 of the head plate 9 are designed as plus pole 25.

The six electrode bundles 1 to 6 with in each case six electrodes connected in parallel are therefore themselves connected in series by in each case two electrode bundles, which are arranged with opposing poles, being electrically conductively connected in the sectors 10 to 12 and 14 and 15, with the exception of the sectors 13 and 16, between which the voltage output from the fuel cell or from the electrode arrangement can be tapped off at the poles 24, 25.

Figure 3:
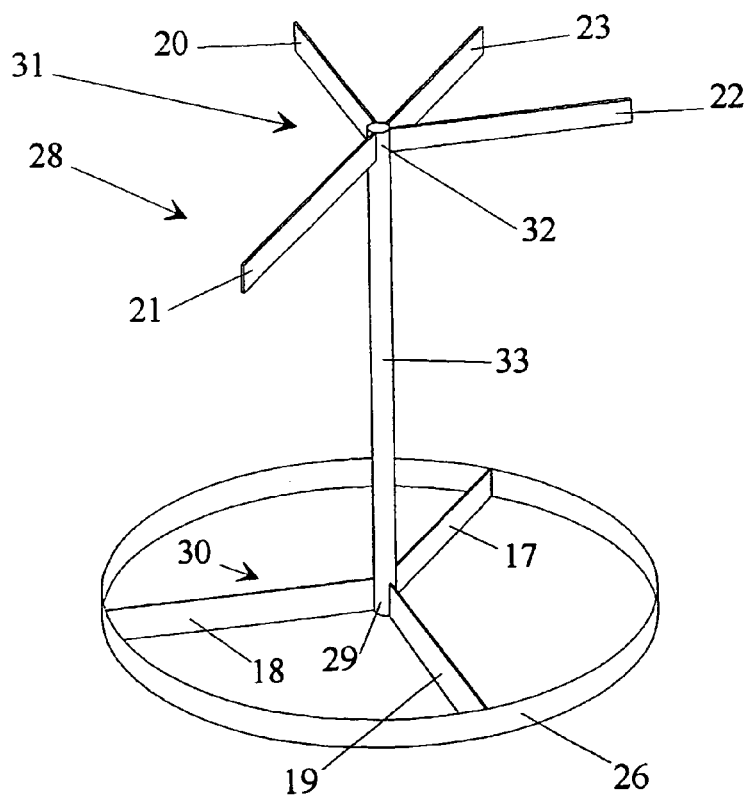
FIG. 3 is an isometric view of a support device according to the invention.

The webs 17 to 19 and 20 to 23 which electrically separate the sectors 10 to 12 and 13 to 16, respectively, and the rings 26, 27 which respectively radially enclose the head plates 8 and 9 can be part of a support device 28, cf. the illustration which is not to scale according to FIG. 3.

In FIG. 3, in which the assignment of the reference numbers have been undertaken in accordance with FIG. 1, it can be seen that the webs 17 to 19 are held at one end in a center 29 in the manner of spokes to form a star 30. The free, radially outer ends of the webs 17 to 19 are enclosed by a ring 26. This measure provides a "casting mold" in which the ends of the electrode bundles 1 to 6 are held by, for example, an electrically conductive casting resin and can be connected electrically.

The webs 20 to 23 of the second head plate 9 can also form a star 31 with a center 32. In FIG. 3, a ring around the second star 32 has been omitted for the sake of clarity.

The centers 29 and 32 are connected to each other by a central rod 33.

An electrically insulating material and an integral design are preferred for the support device 28.

As a consequence of this structural measure, axial forces which act on the electrode arrangement according to FIG. 1 are absorbed by the central rod 33. The electrodes 7 are subjected to scarcely any axial load.

In alternative embodiments, provision may furthermore be made for the ring 26 to be designed in a manner such that it is extended axially in the manner of a sleeve. If appropriate, an extension of this type may result in the provision of a casing wall which completely accommodates the electrodes 7 in the interior.

Given the same axial dimensions, in comparison to an electrode arrangement having electrodes arranged in parallel and rectilinearly in accordance with FIG. 1, it is possible, in the case of an electrode arrangement, for longer individual electrodes or electrode bundles also to be provided in a coiled arrangement in order, for example, owing to the greater length of the individual electrodes, to produce, for example, a higher voltage. All that is required here for this, in comparison to the illustration which is shown, is for the stars 30, 31 to be rotated relative to each other.

Figure 4:
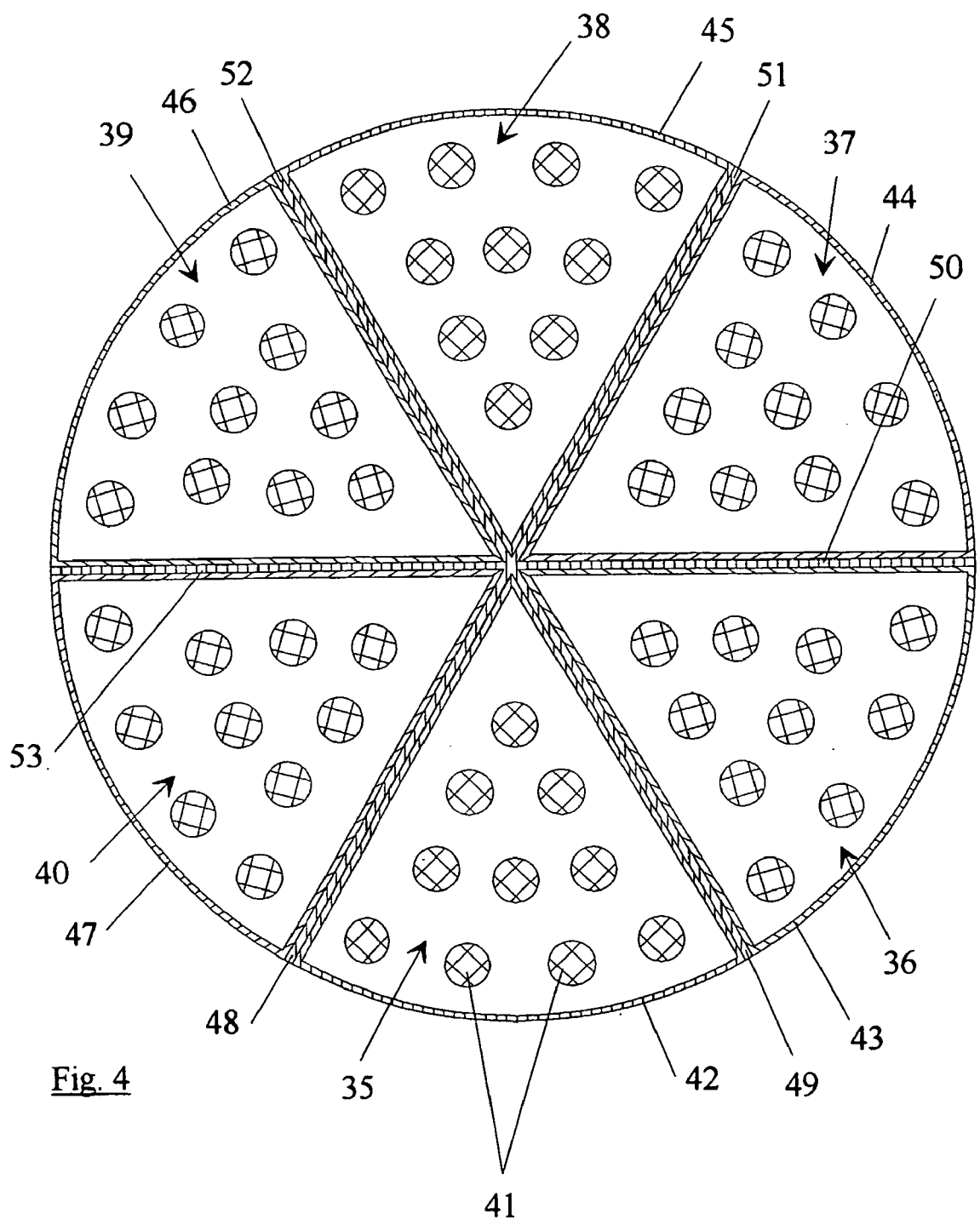
FIG. 4 is a cross section of a further exemplary embodiment of an electrode arrangement according to the invention.

FIG. 4 shows a further exemplary embodiment of an electrode arrangement schematically in a cross section.

Six electrode bundles 35-40 with in each case ten individual elements 41, which are reproduced in a simplified manner and have a fuel component flowing through and/or against them, are illustrated there by way of example, which electrode bundles 35-40 are arranged in each case within a common external electrode 42-47. In the section which is shown, these common external electrodes 42-47 enclose sectors of a circle, the opening angles of which are approximately 60° in the exemplary embodiment.

Opening angles are approximately 60° in the exemplary embodiment. This geometry in the manner of a piece of cake enables a fuel cell of cylindrical construction to be produced according to FIG. 4, in which case then, in order to connect the electrode bundles 35-40 to one another in series, the opposite surfaces of the external electrodes 42-47 have to be insulated electrically from one another. Use can be made for this purpose of a support device of an electrically insulating plastic according to FIG. 3, in which the webs are designed such that they are extended axially, in particular reaching as far as the opposite head plate. Such webs 48-53 then separate the external electrodes 42-47 and, moreover, also ensure the mechanical support, since the external electrodes 42-47 are held "in pockets".

In accordance with the above-described exemplary embodiments, electrode bundles lying next to one another in an encircling manner are bound in an alternating manner in conductive sector halves of the head plates and also in succession, and the external electrodes are preferably likewise bound or connected electrically in another manner. An external electrode 42-47 therefore forms half of a conductive sector of the head plate.

What is claimed is:

1. An electrode arrangement for a fuel cell having two end sides and comprising a plurality of electrode bundles connected in series, each of said plural electrode bundles including a plurality of electrodes connected in parallel, each of said plural electrodes having first and second ends, wherein said first ends of said plurality of electrodes in each respective one of said plural electrode bundles are gathered together on one of the end sides and connected electrically and said second ends of said plurality of electrodes in each respective one of said plural electrode bundles are gathered together on the other one of the end sides and connected electrically;

a first head plate on said one of said end sides having a plurality of electrically conductive sectors which are insulated from one another, wherein each of said electrode bundles are held on said one of said end sides by said electrically conductive sectors, wherein opposing poles of two of said plural electrode bundles are connected in an electrically conductive manner by one sector of said plural electrically conductive sectors, thereby creating a senes connection of said two of said plural electrode bundles; and a second head plate on the other of said side ends, wherein said first head plate has n sectors and said second head plate has n+1 sectors, where n represents a whole number.

2. The electrode arrangement of claim 1, wherein said plurality of electrodes are spaced apart from one another.

3. The electrode arrangement of claim 1, wherein said sectors are sectors of a circle.

4. The electrode arrangement of claim 1, wherein said electrically conductive sectors are separated from one another by nonconductive webs.

5. The electrode arrangement of claim 4, wherein said webs are held at said one of said end sides in a center and comprise free ends which extend radially outward from the center in a star formation.

6. The electrode arrangement of claim 5, further comprising a ring enclosing said free ends of said webs.

7. The electrode arrangement of claim 6, wherein said ring comprises a sleeve having an axial extension.

8. The electrode arrangement of claim 5, further comprising a second head plate on the other of said end sides having a plurality of electrically conductive sectors which are insulated from one another by non-conductive webs which are held at a center of said second head plate and comprise free ends, wherein each of said electrode bundles are held on the other one of said end sides in said electrically conductive sectors, and a central rod connecting the centers of said first and second head plates.

9. The electrode arrangement of claim 1, wherein said electrodes extend rectilinearly and parallel.

10. The electrode arrangement of claim 1, wherein said electrodes are arranged so that said electrodes are coiled.

11. The electrode arrangement of claim 1, wherein one of said electrode bundles has a common external electrode.

12. The electrode arrangement of claim 11, wherein said common external electrode encloses in cross section a sector of a circle.

13. The electrode arrangement of claim 11, further comprising a plurality of common external electrodes arranged adjacent one another and forming a circle.

14. The electrode arrangement of claim 13, wherein opposing surfaces of adjacent ones of said external electrodes are insulated electrically from one another.

15. The electrode arrangement of claim 13, wherein sectors of a circle of two of said common external electrodes correspond to one electrically conductive sector.

16. The electrode arrangement of claim 11, further comprising further electrodes spaced apart radially and parallel to said one of said electrode bundles with a common external electrode.

17. A support device for an electrode arrangement including a plurality of electrode bundles connected in series, each of said plural electrode bundles including a plurality of electrodes connected in parallel, each of said plural electrodes having first and second ends, said support device comprising:

a first head end having webs connected at a center position and extending radially from said center, said webs defining sectors in which the first ends of the bundles of electrodes are receivable;

a second head end having webs connected at a center position and extending radially from said center, said webs defining sectors in which the second ends of the bundles of electrodes are receivable, wherein said first head end has n webs and said second head has n+1 webs, where n represents a whole number; and a central rod connected between the said centers of said first and second head ends, said first and second head ends being arranged on said central rod such that a projection of each sector on said first head end parallel to said central rod covers portions of two sectors on said second head end, whereby electrode bundles connected in one sector on said first head end are connectable to two different sectors on said second head end.

18. The support device of claim 17, wherein said first head end, said second head end and said central rod consist integrally of an electrically nonconductive material.

19. The support device of claim 17, wherein each of said first and second head ends includes a ring enclosing the free ends of the webs.

* * * * *